US012726306B2

(12) United States Patent
Kang et al.

(10) Patent No.: US 12,726,306 B2
(45) Date of Patent: Sep. 1, 2026

(54) METHOD AND DEVICE FOR PERFORMING UPLINK TRANSMISSION AND RECEPTION IN WIRELESS COMMUNICATION SYSTEM

(71) Applicant: LG ELECTRONICS INC., Seoul (KR)

(72) Inventors: Jiwon Kang, Seoul (KR); Kyuseok Kim, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 18/708,122

(22) PCT Filed: Nov. 24, 2022

(86) PCT No.: PCT/KR2022/018726

§ 371 (c)(1),
(2) Date: May 7, 2024

(87) PCT Pub. No.: WO2023/096375

PCT Pub. Date: Jun. 1, 2023

(65) Prior Publication Data

US 2025/0015948 A1 Jan. 9, 2025

(30) Foreign Application Priority Data

Nov. 26, 2021 (KR) ........................ 10-2021-0166019

(51) Int. Cl.
*H04L 5/00* (2006.01)

(52) U.S. Cl.
CPC .................................. *H04L 5/0048* (2013.01)

(58) Field of Classification Search
CPC ... H04L 5/0048; H04L 5/0057; H04L 5/0094; H04B 17/328; H04B 17/347;

(Continued)

(56) References Cited

U.S. PATENT DOCUMENTS

2019/0149216 A1 5/2019 Tsai et al.
2021/0167821 A1 6/2021 Chen et al.
2021/0227530 A1* 7/2021 Farag .................... H04W 72/20

OTHER PUBLICATIONS

PCT International Application No. PCT/KR2022/018726, International Search Report dated Mar. 3, 2023, 3 pages.

(Continued)

*Primary Examiner* — Sai Aung
*Assistant Examiner* — Angelie T Ngo
(74) *Attorney, Agent, or Firm* — LEE, HONG, DEGERMAN, KANG & WAIMEY

(57) ABSTRACT

Disclosed are a method and a device for performing uplink transmission and reception in a wireless communication system. A method for performing uplink transmission in a wireless communication system, according to one embodiment of the present disclosure, comprises the steps of: transmitting capability information related to at least one index (ID) to a base station; receiving configuration information related to a beam report from the base station; and transmitting report information to the base station on the basis of the configuration information, wherein the report information includes an indicator of at least one downlink (DL) reference signal (RS) resource, and a specific ID for the indicator of the at least one DL RS resource among the at least one ID, wherein capability information corresponding to the specific ID may include information indicating that the maximum number of sounding reference signal (SRS) ports supported by a terminal is 0 or information indicating that the maximum number of SRS ports cannot be applied.

13 Claims, 13 Drawing Sheets

(58) Field of Classification Search
CPC .............. H04B 7/06952; H04B 7/0628; H04B 17/336; H04W 8/24
See application file for complete search history.

(56) References Cited

OTHER PUBLICATIONS

Nokia et al., "Enhancements on Multi-beam Operation," R1-2109870, 3GPP TSG RAN WG1 #106-bis-e, e-Meeting, Oct. 2021, 27 pages.
LG Electronics, "Enhancements on Multi-beam Operation," R1-2107814, 3GPP TSG RAN WG1 #106-e, e-Meeting, Aug. 2021, 18 pages.
LG Electronics, "Enhancements on Multi-beam Operation," R1-2111453, 3GPP TSG RAN WG1 #107-e, e-Meeting, Nov. 2021, 13 pages.
European Patent Office Application Serial No. 22899057.8, Search Report dated Oct. 16, 2025, 10 pages.
Mediatek Inc., "Enhancement on multi-beam operation," R1-2112276, 3GPP TSG RAN WG1 #107-e, e-Meeting, Nov. 2021, 18 pages.

* cited by examiner

FIG.6

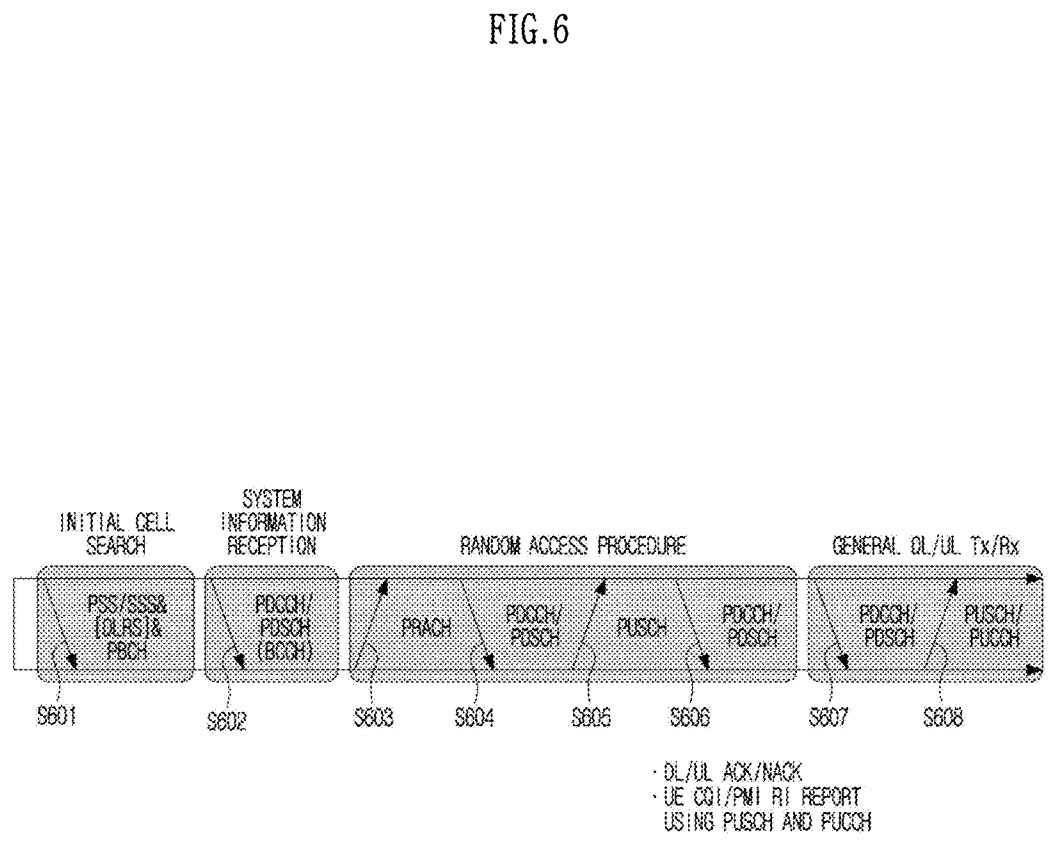

INITIAL CELL SEARCH
PSS/SSS& [DLRS]& PBCH
S601

SYSTEM INFORMATION RECEPTION
PDCCH/ PDSCH (BCCH)
S602

RANDOM ACCESS PROCEDURE
PRACH
S603
PDCCH/ PDSCH
S604
PUSCH
S605
PDCCH/ PDSCH
S606

GENERAL DL/UL Tx/Rx
PDCCH/ PDSCH
S607
PUSCH/ PUCCH
S608

· DL/UL ACK/NACK
· UE CQI/PMI RI REPORT USING PUSCH AND PUCCH

FIG. 18

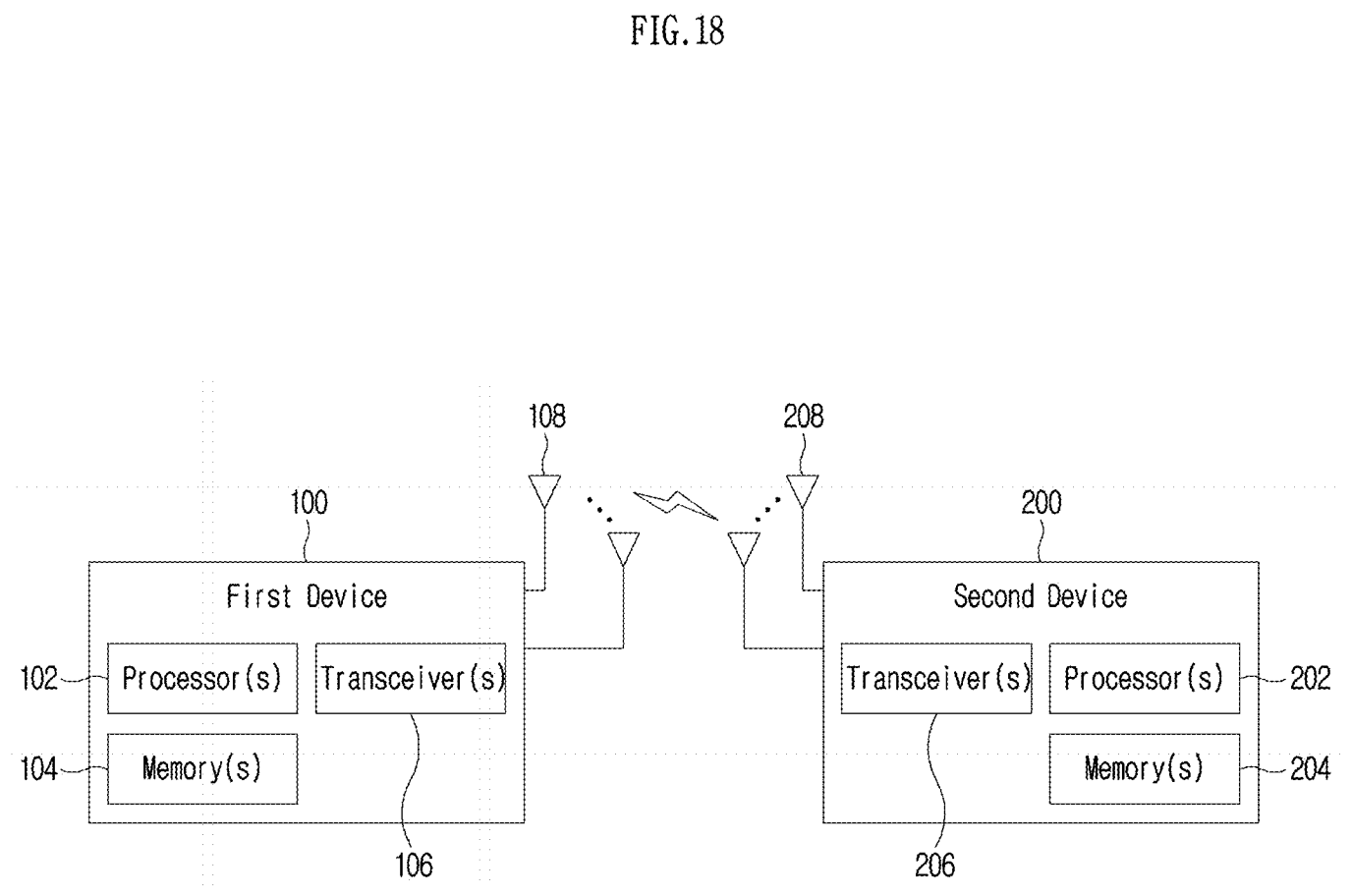

100 First Device
102 Processor(s)
104 Memory(s)
106 Transceiver(s)
108

200 Second Device
202 Processor(s)
204 Memory(s)
206 Transceiver(s)
208

METHOD AND DEVICE FOR PERFORMING UPLINK TRANSMISSION AND RECEPTION IN WIRELESS COMMUNICATION SYSTEM

CROSS-REFERENCE TO RELATED APPLICATION(S)

This application is the National Stage filing under 35 U.S.C. 371 of International Application No. PCT/KR2022/018726, filed on Nov. 24, 2022, which claims the benefit of earlier filing date and right of priority to Korean Application No. 10-2021-0166019, filed on Nov. 26, 2021, the contents of which are all hereby incorporated by reference herein in their entireties.

TECHNICAL FIELD

The present disclosure relates to a wireless communication system, and more specifically, to a method and device for performing uplink transmission and reception in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

The technical problem of the present disclosure is to provide a method and device for performing uplink transmission and reception in a wireless communication system.

Additionally, an additional technical problem of the present disclosure is to provide a method and device for performing beam reporting in consideration of panels that cannot transmit.

In addition, an additional technical problem of the present disclosure is to provide a method and device for transmitting and receiving an index (ID) indicating that the maximum number of SRS ports supported by the user equipment (UE) is 0 or that the maximum number of SRS ports is not applicable.

The technical objects to be achieved by the present disclosure are not limited to the above-described technical objects, and other technical objects which are not described herein will be clearly understood by those skilled in the pertinent art from the following description.

According to an embodiment of the present disclosure, a method of performing uplink transmission by a user equipment (UE) in a wireless communication system may include transmitting, to a base station, capability information related to at least one index (ID); receiving, from the base station, configuration information related to a beam report; and transmitting, to the base station, report information based on the configuration information, and the report information may include an indicator of at least one downlink (DL) reference signal (RS) resource, and a specific ID for the indicator of the at least one DL RS resource among the at least one ID, and capability information corresponding to the specific ID may include information indicating that a maximum number of sounding reference signal (SRS) ports supported by the UE is 0 or information indicating that a maximum number of SRS ports is not applicable.

According to another embodiment of the present disclosure, a method of performing uplink reception by a base station in a wireless communication system may include receiving, from a user equipment (UE), capability information related to at least one index (ID); transmitting, to the UE, configuration information related to a beam report; and receiving, from the UE, report information based on the configuration information, and the report information may include an indicator of at least one downlink (DL) reference signal (RS) resource, and a specific ID for the indicator of the at least one DL RS resource among the at least one ID, and capability information corresponding to the specific ID may include information indicating that a maximum number of sounding reference signal (SRS) ports supported by the UE is 0 or information indicating that a maximum number of SRS ports is not applicable.

According to an embodiment of the present disclosure, a method and device for performing uplink transmission and reception in a wireless communication system may be provided.

Additionally, according to an embodiment of the present disclosure, a method and device for performing beam reporting in consideration of a panel that cannot transmit may be provided.

Additionally, according to an embodiment of the present disclosure, a method and device for transmitting and receiving an ID indicating that the maximum number of SRS ports supported by the terminal is 0 or that the maximum number of SRS ports cannot be applied may be provided.

Additionally, according to an embodiment of the present disclosure, a terminal with a DL only panel can report the beam/panel from a DL/UL perspective through a panel-specific beam reporting method.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 18 is a diagram illustrating a block configuration of a wireless communication device according to an embodiment of the present disclosure.

DETAILED DESCRIPTION

Figure 1:
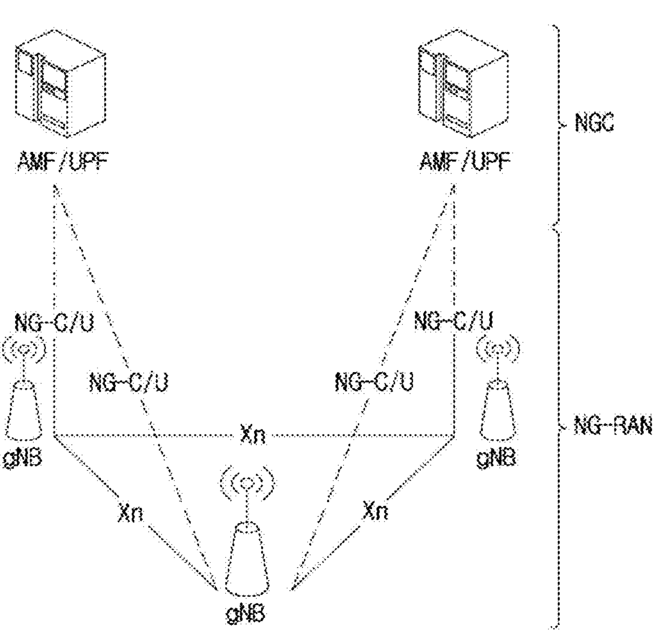
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power

Overall System

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
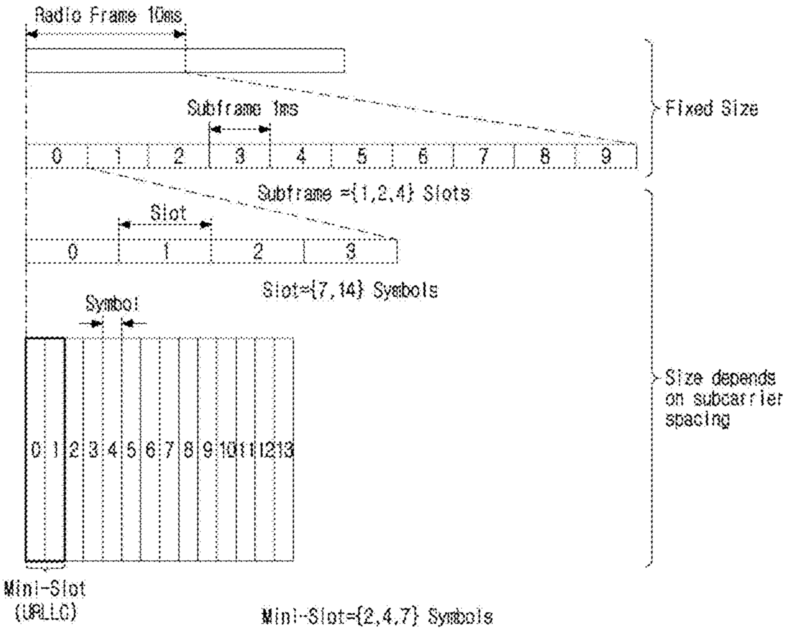
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 KHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot 10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered.

Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
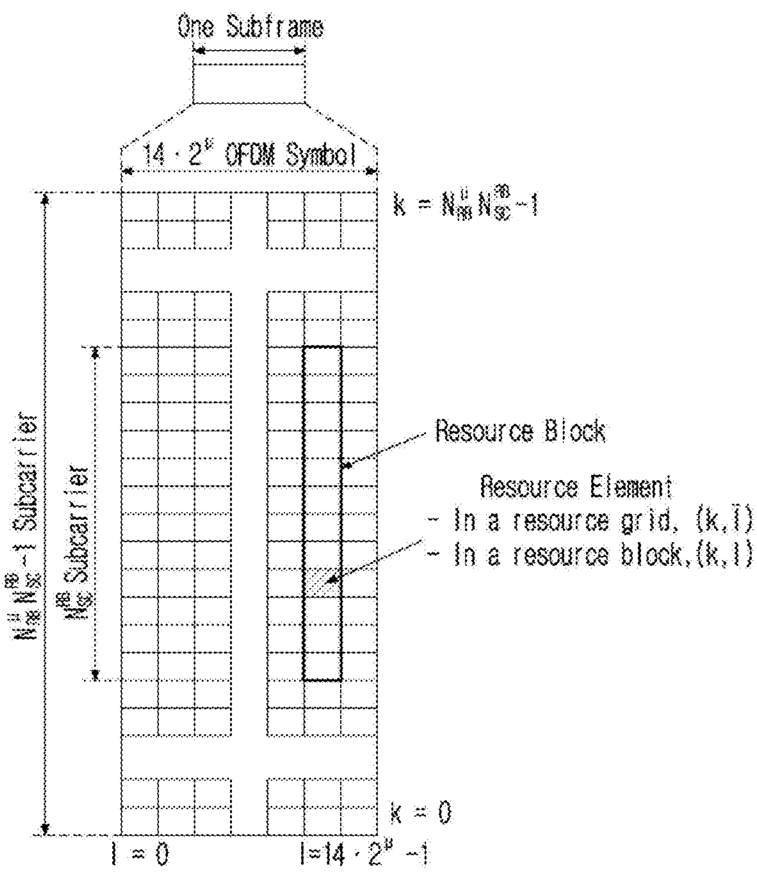
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14\cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies.

In this case, one resource grid may be configured per u and antenna port p. Each element of a resource grid for μ and an antenna port p is referred to as a resource element and is uniquely identified by an index pair (k,l'). Here, k=0, . . . , $N_{RB}^{\mu}N_{sc}^{RB}-1$ is an index in a frequency domain and l'=0, . . . , $2^{\mu}N_{symb}^{(\mu)}-1$ refers to a position of a symbol in a subframe. When referring to a resource element in a slot, an index pair (k,l) is used. Here, l=0, . . . , $N_{symb}^{\mu}-1$. A resource element (k,l') for u and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequency PointA represents a frequency-position of point A expressed as in ARFCN (absolute radio-frequency channel number). Common resource blocks are numbered from 0 to the top in a frequency domain for a subcarrier spacing configuration μ. The center of subcarrier 0 of common resource block 0 for a subcarrier spacing configuration u is identical to 'point A'. A relationship between a common resource block number $n_{CRB}^{\mu}$ and a resource element (k,l) for a subcarrier spacing configuration u in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
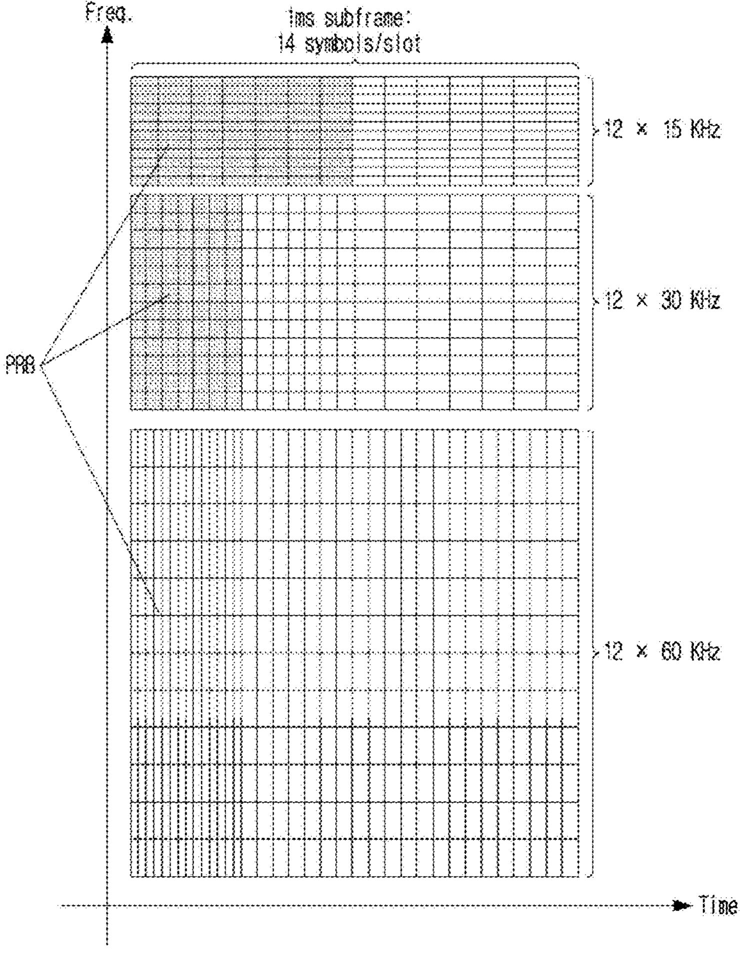
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
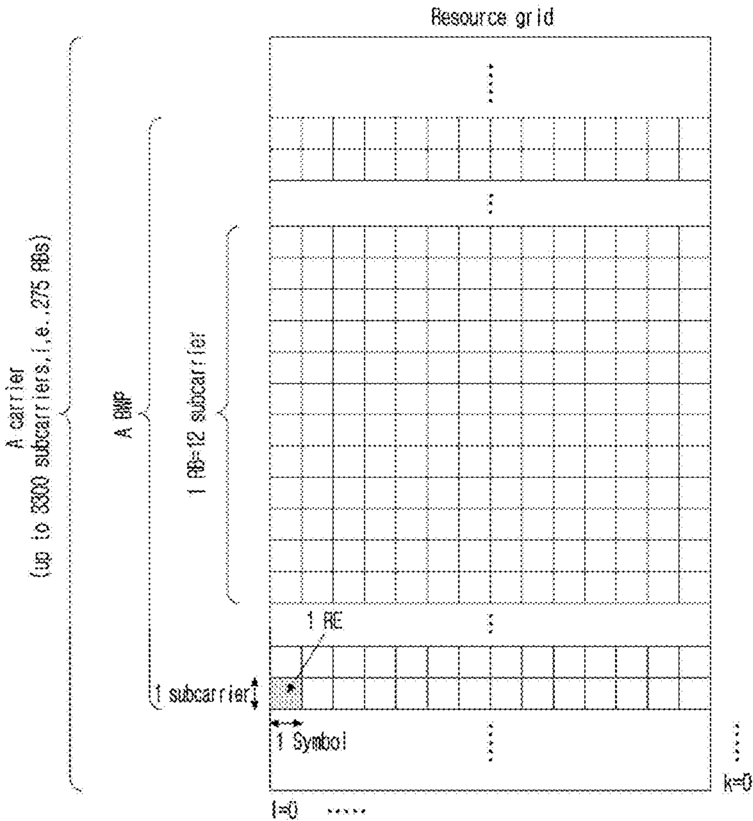
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHZ may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP.

Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC.

A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP.

But, a configuration on a DL/UL BWP may not be received when a terminal performs an initial access procedure or before a RRC connection is set up, so a DL/UL BWP which is assumed by a terminal under these situations is defined as an initial active DL/UL BWP.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Beam Management (BM)

A BM procedure is L1 (layer 1)/L2 (layer 2) procedures to obtain and maintain a set of beams of a base station (e.g., a gNB, a TRP, etc.) and/or terminal (e.g., a UE) beams which may be used for downlink (DL) and uplink (UL) transmission/reception, it may include the following procedures and terms.

Beam measurement: An operation that a base station or a UE measures a property of a received beamformed signal Beam determination: An operation that a base station or a UE selects its Tx beam/Rx beam Beam sweeping: An operation that a spatial region is covered by using a Tx and/or Rx beam for a certain time interval in a pre-determined method Beam report: An operation that a UE reports information of a beamformed signal based on beam measurement A BM procedure may be classified into (1) a DL BM procedure using a SS (synchronization signal)/PBCH (physical broadcast channel) Block or a CSI-RS and (2) an UL BM procedure using an SRS (sounding reference signal).

In addition, each BM procedure may include Tx beam sweeping for determining a Tx Beam and Rx beam sweeping for determining a Rx beam.

A configuration on a beam report using an SSB is performed in a CSI/beam configuration in a RRC connected state (or a RRC connected mode).

Figure 8:
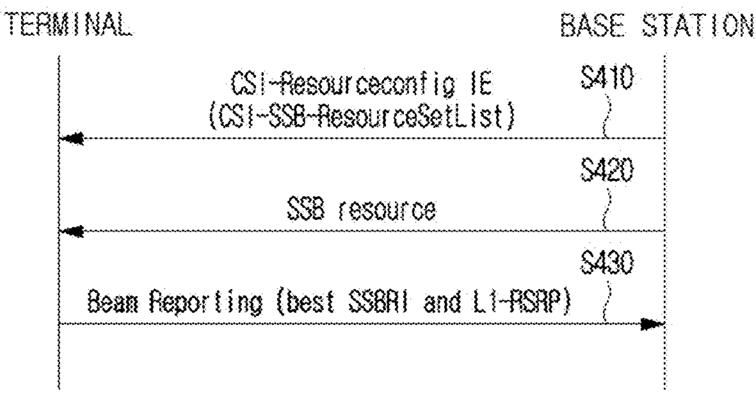
FIG. 8 is a diagram illustrating a downlink beam management procedure using SSB in a wireless communication system to which the present disclosure may be applied.

In reference to FIG. 8, a terminal receives CSI-ResourceConfig IE including CSI-SSB-ResourceSetList including SSB resources used for BM from a base station (S410).

Table 6 represents an example of CSI-ResourceConfig IE and as in Table 6, a BM configuration using an SSB configures an SSB like a CSI-RS resource without being separately defined.

TABLE 6

```
-- ASN1START
-- TAG-CSI-RESOURCECONFIG-START
CSI-ResourceConfig ::=                SEQUENCE {
   csi-ResourceConfigId               CSI-ResourceConfigId,
   csi-RS-ResourceSetList                CHOICE {
      nzp-CSI-RS-SSB                        SEQUENCE {
         nzp-CSI-RS-ResourceSetList            SEQUENCE (SIZE
(1..maxNrofNZP-CSI-RS-ResourceSetsPerConfig)) OF NZP-CSI-RS-ResourceSetId
OPTIONAL,
         csi-SSB-ResourceSetList               SEQUENCE (SIZE
(1..maxNrofCSI-SSB-ResourceSetsPerConfig)) OF CSI-SSB-ResourceSetId
   OPTIONAL
      },                                 SEQUENCE (SIZE (1..maxNrofCSI-IM-
      csi-IM-ResourceSetList
ResourceSetsPerConfig)) OF CSI-IM-ResourceSetId
   },
   bwp-Id                                BWP-Id,
   resourceType                       ENUMERATED { aperiodic, semiPersistent,
periodic },
   ...
}
-- TAG-CSI-RESOURCECONFIGTOADDMOD-STOP
-- ASN1STOP
```

Hereinafter, a DL BM procedure will be described.

A DL BM procedure may include (1) transmission of beamformed DL RSs (reference signals) of a base station (e.g., a CSI-RS or a SS Block (SSB)) and (2) beam reporting of a terminal.

Here, beam reporting may include preferred DL RS ID (identifier) (s) and corresponding L1-RSRP (Reference Signal Received Power).

The DL RS ID may be a SSBRI (SSB Resource Indicator) or a CRI (CSI-RS Resource Indicator).

Hereinafter, a DL BM procedure using an SSB will be described.

Figure 7:
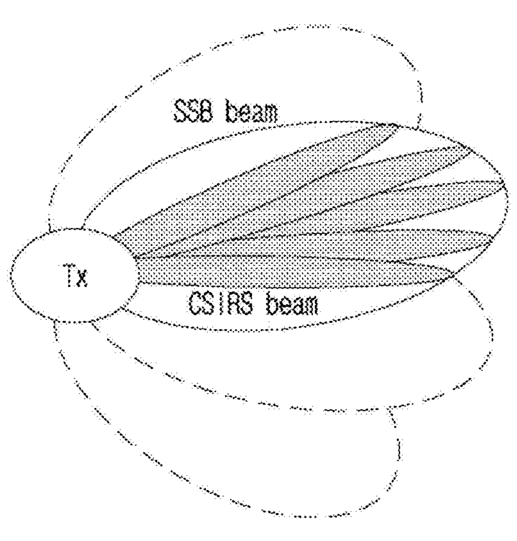
FIG. 7 is a diagram illustrating a downlink beam management operation in a wireless communication system to which the present disclosure may be applied.

FIG. 7 is a diagram which illustrates a downlink beam management operation in a wireless communication system to which the present disclosure may be applied.

In reference to FIG. 7, an SSB beam and a CSI-RS beam may be used for beam measurement. A measurement metric is L1-RSRP per resource/block. An SSB may be used for coarse beam measurement and a CSI-RS may be used for fine beam measurement. An SSB may be used for both of Tx beam sweeping and Rx beam sweeping.

Rx beam sweeping using an SSB may be performed while an UE changes an Rx beam for the same SSBRI across a plurality of SSB bursts. In this case, one SS burst includes one or more SSBs and one SS burst set includes one or more SSB bursts.

FIG. 8 is a diagram which illustrates a downlink beam management procedure using SSB in a wireless communication system to which the present disclosure may be applied.

In Table 6, a csi-SSB-ResourceSetList parameter represents a list of SSB resources used for beam management and reporting in one resource set. Here, an SSB resource set may be configured as {SSBx1, SSBx2, SSBx3, SSBx4, . . . }. An SSB index may be defined from 0 to 63. A terminal receives an SSB resource from the base station based on the CSI-SSB-ResourceSetList (S420).

When CSI-RS reportConfig related to a report on a SSBRI and L1-RSRP is configured, the terminal performs (beam) reporting of the best SSBRI and corresponding L1-RSRP to a base station (S430).

Hereinafter, a DL BM procedure using a CSI-RS will be described.

Describing a usage of a CSI-RS, i) a repetition parameter is configured for a specific CSI-RS resource set and when TRS_info is not configured, a CSI-RS is used for beam management. ii) when a repetition parameter is not configured and TRS_info is configured, a CSI-RS is used for a TRS (tracking reference signal). iii) when a repetition parameter is not configured and TRS_info is not configured, a CSI-RS is used for CSI acquisition.

Such a repetition parameter may be configured only for CSI-RS resource sets associated with CSI-ReportConfig having a report of L1 RSRP or 'No Report (or None)'.

If a terminal is configured with CSI-ReportConfig in which reportQuantity is configured as 'cri-RSRP' or 'none' and CSI-ResourceConfig for channel measurement (a higher layer parameter resourcesForChannelMeasurement) does not include a higher layer parameter 'trs-Info' and includes NZP-CSI-RS-ResourceSet in which a higher layer parameter 'repetition' is configured, the terminal may be configured only with a same number of port (1-port or 2-port) having a higher layer parameter 'nrofPorts' for all CSI-RS resources in NZP-CSI-RS-ResourceSet.

When (a higher layer parameter) repetition is configured as 'ON', it is related to a Rx beam sweeping procedure of a terminal. In this case, when a terminal is configured with NZP-CSI-RS-ResourceSet, the terminal may assume that at least one CSI-RS resource in NZP-CSI-RS-ResourceSet is transmitted with the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted in a different OFDM symbol. In addition, a terminal does not expect to receive a different periodicity in periodicity AndOffset in all CSI-RS resources in NZP-CSI-RS-Resourceset.

Meanwhile, when repetition is configured as 'OFF', it is related to a Tx beam sweeping procedure of a base station. In this case, when repetition is configured as 'OFF', a terminal does not assume that at least one CSI-RS resource in NZP-CSI-RS-ResourceSet is transmitted in the same downlink spatial domain transmission filter. In other words, at least one CSI-RS resource in NZP-CSI-RS-ResourceSet is transmitted through a different Tx beam.

In other words, when reportQuantity of the CSI-RS reportConfig IE is configured as 'ssb-Index-RSRP', a terminal reports the best SSBRI and corresponding L1-RSRP to a base station.

In addition, when a CSI-RS resource may be configured in the same OFDM symbol(s) as an SSB (SS/PBCH Block) and 'QCL-TypeD' is applicable, the terminal may assume that a CSI-RS and an SSB are quasi co-located with regard to 'QCL-TypeD'.

Here, the QCL TypeD may mean that antenna ports are quasi-colocated with regard to a spatial Rx parameter. When a terminal receives a plurality of DL antenna ports in a QCL Type D relationship, it is allowed to apply the same Rx beam. In addition, a terminal does not expect that a CSI-RS will be configured in a RE overlapped with a RE of an SSB.

Figure 9:
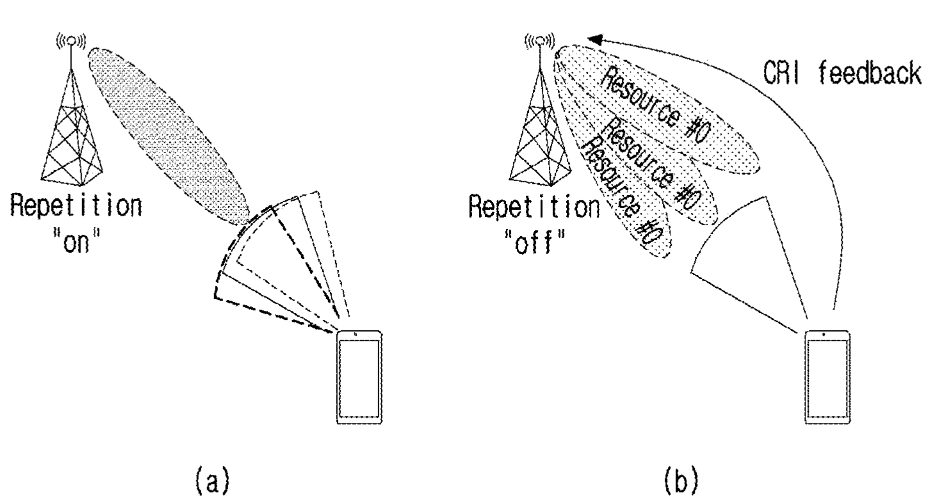
FIG. 9 is a diagram illustrating a downlink beam management operation using CSI-RS in a wireless communication system to which the present disclosure may be applied.

FIG. 9 is a diagram which illustrates a downlink beam management operation using CSI-RS in a wireless communication system to which the present disclosure may be applied.

FIG. 9(*a*) represents a Rx beam determination (or refinement) procedure of a terminal and FIG. 9(*b*) represents a Tx beam sweeping procedure of a base station. In addition, FIG. 9(*a*) is a case when a repetition parameter is configured as 'ON' and FIG. 9(*b*) is a case when a repetition parameter is configured as 'OFF'.

Figure 10:
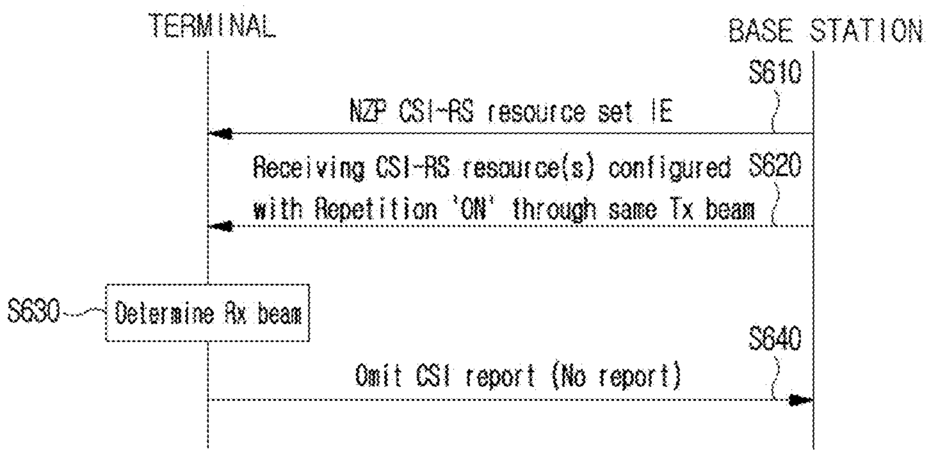
FIG. 10 is a diagram illustrating a process for determining a reception beam of a terminal in a wireless communication system to which the present disclosure may be applied.

FIG. 10 is a diagram which illustrates an Rx beam determination process of a terminal in a wireless communication system to which the present disclosure may be applied.

In reference to FIG. 9(*a*) and FIG. 10, an Rx beam determination process of a terminal is described.

A terminal receives NZP CSI-RS resource set IE including a higher layer parameter repetition through RRC signaling from a base station (S610). Here, the repetition parameter is configured as 'ON'.

A terminal repetitively receives resources in a CSI-RS resource set configured as repetition 'ON' through the same Tx beam (or DL spatial domain transmission filter) of a base station in a different OFDM symbol (S620).

A terminal determines its Rx beam (S630).

A terminal omits a CSI report (S640). In this case, reportQuantity of a CSI report configuration may be configured as 'No report (or None)'.

In other words, the terminal may omit a CSI report when it is configured as repetition 'ON'.

Figure 11:
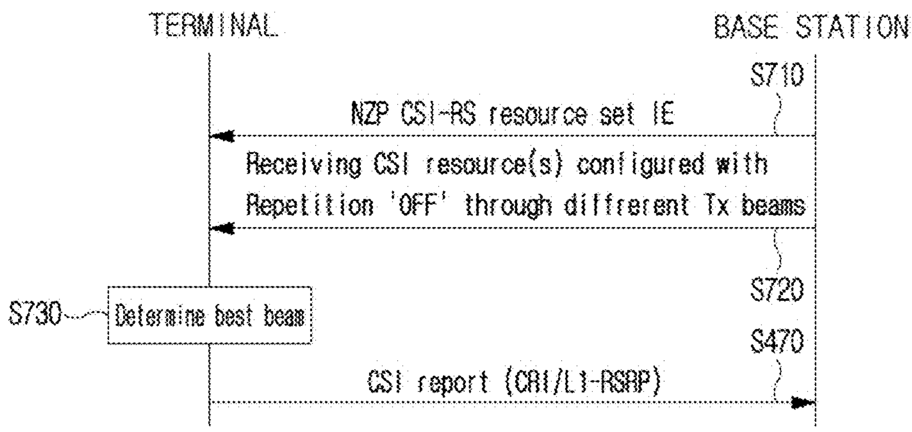
FIG. 11 is a diagram illustrating a transmission beam determination process of a base station in a wireless communication system to which the present disclosure may be applied.

FIG. 11 is a diagram which illustrates a Tx beam determination process of a base station in a wireless communication system to which the present disclosure may be applied.

In reference to FIG. 9(*b*) and FIG. 11, a Tx beam determination process of a base station is described.

A terminal receives NZP CSI-RS resource set IE including a higher layer parameter repetition through RRC signaling from a base station (S710). Here, the repetition parameter is configured as 'OFF' and it is related to a Tx beam sweeping procedure of a base station.

A terminal receives resources in a CSI-RS resource set configured as repetition 'OFF' through a different Tx beam (or DL spatial domain transmission filter) of a base station (S720).

A terminal selects (or determines) the best beam (S740).

A terminal reports an ID and related quality information (e.g., L1-RSRP) of a selected beam to a base station (S740). In this case, reportQuantity of a CSI report configuration may be configured as 'CRI+L1-RSRP'.

In other words, when a CSI-RS is transmitted for BM, the terminal reports a CRI and a related L1-RSRP.

Figure 12:
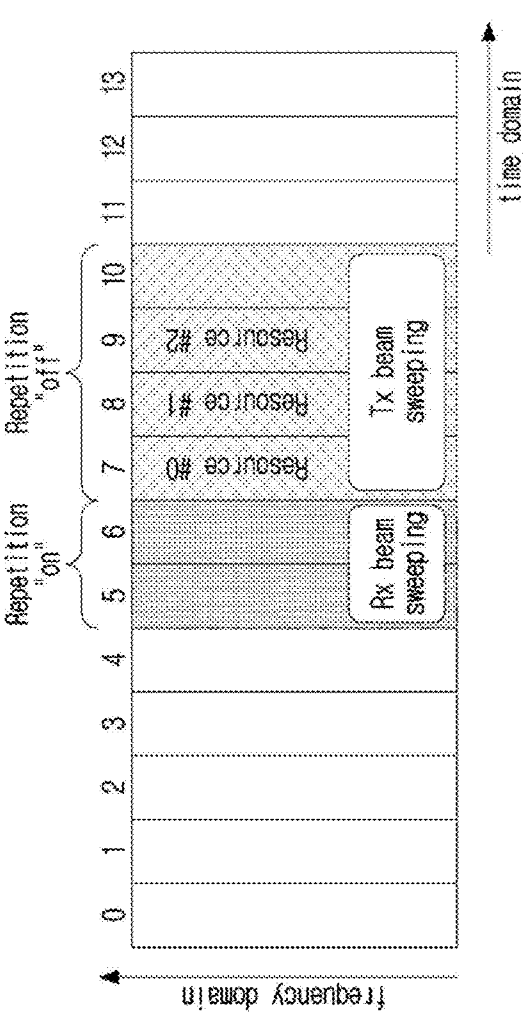
FIG. 12 is a diagram illustrating resource allocation in time and frequency domains related to the operation of downlink beam management in a wireless communication system to which the present disclosure may be applied.

FIG. 12 is a diagram which illustrates resource allocation in a time and frequency domain related to a downlink beam management operation in a wireless communication system to which the present disclosure may be applied.

In reference to FIG. 12, it is shown that when repetition 'ON' is configured in a CSI-RS resource set, a plurality of CSI-RS resources are repetitively used by applying the same Tx beam and when repetition 'OFF' is configured in a CSI-RS resource set, different CSI-RS resources are transmitted in a different Tx beam.

Hereinafter, a beam indication method related to downlink BM will be described.

A terminal may be configured by RRC with a list of a maximum M candidate transmission configuration indication (TCI) states at least for a purpose of a QCL (Quasi Co-location) indication. Here, M may be 64.

Each TCI state may be configured as one RS set. Each ID of a DL RS at least for a spatial QCL purpose (QCL Type D) in a RS set may refer to one of DL RS types such as an SSB, a P (periodic)-CSI RS, an SP (semi-persistent)-CSI RS, an A (aperiodic)-CSI RS, etc.

An ID of DL RS(s) in a RS set used at least for a purpose of a spatial QCL may be initialized/updated at least by explicit signaling.

Table 7 illustrates a TCI-State information element (IE).

A TCI-State IE is associated with a quasi co-location (QCL) type corresponding to one or two DL reference signals (RS).

TABLE 7

```
-- ASN1START
-- TAG-TCI-STATE-START
TCI-State ::=                SEQUENCE {
  tci-StateId                  TCI-StateId,
```

TABLE 7-continued

```
    qcl-Type1               QCL-Info,
    qcl-Type2               QCL-Info
                        OPTIONAL,   -- Need R
    ...
}
QCL-Info ::=              SEQUENCE {
    cell                    ServCellIndex
                        OPTIONAL,   -- Need R
    bwp-Id                    BWP-Id
                          OPTIONAL, -- Cond CSI-RS-Indicated
    referenceSignal         CHOICE {
      csi-rs                  NZP-CSI-RS-ResourceId,
      ssb                       SSB-Index
    },
    qcl-Type                ENUMERATED {typeA, typeB, typeC, typeD},
    ...
}
-- TAG-TCI-STATE-STOP
-- ASN1STOP
```

In Table 7, a bwp-Id parameter represents a DL BWP (bandwidth part) where an RS is located, a cell parameter represents a carrier where a RS is located and a referencesignal parameter represents reference antenna port(s) which is a source of a quasi co-location for corresponding target antenna port(s) or a reference signal including it. The target antenna port(s) may be a CSI-RS, a PDCCH DMRS, or a PDSCH DMRS. In an example, a corresponding TCI state ID (identifier) may be indicated in NZP CSI-RS resource configuration information to indicate QCL reference RS information for a NZP (non-zero power) CSI-RS. In another example, a TCI state ID may be indicated to each CORESET configuration to indicate QCL reference information for PDCCH DMRS antenna port(s). In another example, a TCI state ID may be indicated through DCI to indicate QCL reference information for PDSCH DMRS antenna port(s). Hereinafter, uplink beam management will be described.

For UL BM, beam reciprocity (or beam correspondence) between a Tx beam and a Rx beam may be valid or may not be valid according to terminal implementation. If reciprocity between a Tx beam and a Rx beam is valid both in a base station and a terminal, a UL beam pair may be matched by a DL beam pair. But, when reciprocity between a Tx beam and a Rx beam is not valid in any one of a base station and a terminal, a process for determining a UL beam pair is required separately from a DL beam pair determination.

In addition, although both of a base station and a terminal maintain beam correspondence, a base station may use a UL BM procedure for determining a DL Tx beam without requesting a terminal to report a preferred beam.

UL BM may be performed through beamformed UL SRS transmission and whether UL BM of an SRS resource set is applied may be configured by a (higher layer parameter) usage. When a usage is configured as ‘BeamManagement (BM)’, only one SRS resource may be transmitted in each of a plurality of SRS resource sets in a given time instant.

A terminal may be configured with one or more SRS (Sounding Reference Symbol) resource sets configured by (a higher layer parameter) SRS-ResourceSet (through higher layer signaling, RRC signaling, etc.) For each SRS resource set, a UE may be configured with $K \geq 1$ SRS resources (a higher layer parameter SRS-resource). Here, K is a natural number and the maximum number of K is indicated by SRS_capability.

Like DL BM, an UL BM procedure may be also classified into Tx beam sweeping of a terminal and Rx beam sweeping of a base station.

Figure 13:
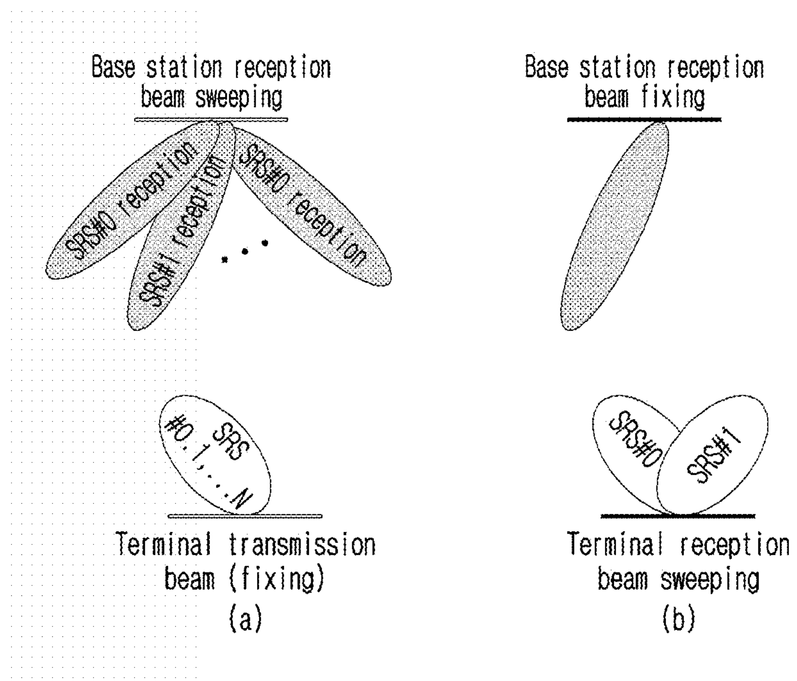
FIG. 13 is a diagram illustrating an uplink beam management operation using SRS in a wireless communication system to which the present disclosure may be applied.

FIG. 13 is a diagram which illustrates an uplink beam management operation using SRS in a wireless communication system to which the present disclosure may be applied.

FIG. 13(*a*) illustrates a Rx beam determination operation of a base station and FIG. 13(*b*) illustrates a Tx beam sweeping operation of a terminal.

Figure 14:
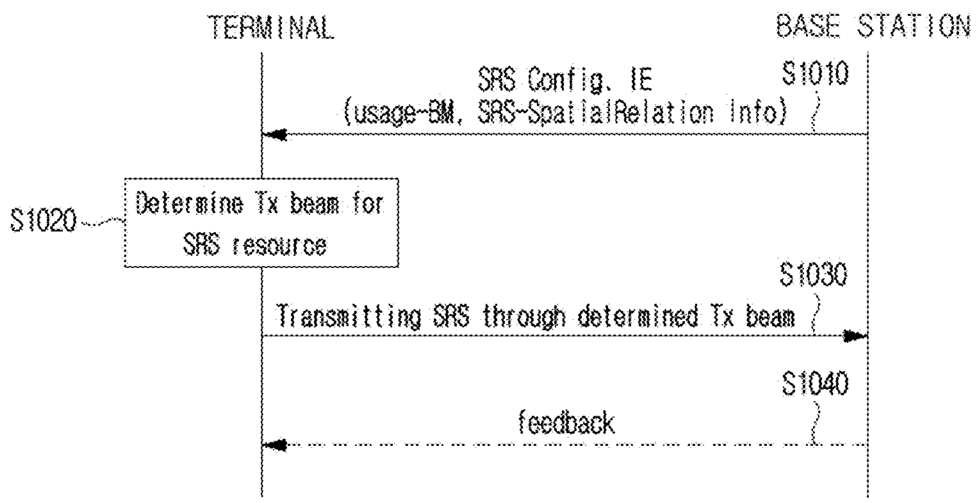
FIG. 14 is a diagram illustrating an uplink beam management procedure in a wireless communication system to which the present disclosure may be applied.

FIG. 14 is a diagram which illustrates an uplink beam management procedure in a wireless communication system to which the present disclosure may be applied.

A terminal receives RRC signaling (e.g., an SRS-Config IE) including a (higher layer parameter) usage parameter configured as ‘beam management’ from a base station (S1010).

Table 8 represents an example of an SRS-Config IE (Information Element) and an SRS-Config IE is used for SRS transmission configuration. An SRS-Config IE includes a list of SRS-Resources and a list of SRS-ResourceSets. Each SRS resource set means a set of SRS-resources.

A network may trigger transmission of an SRS resource set by using configured aperiodicSRS-ResourceTrigger (L1 DCI).

TABLE 8

```
-- ASN1START
-- TAG-MAC-CELL-GROUP-CONFIG-START
SRS-Config ::=                               SEQUENCE {
    srs-ResourceSetToReleaseList             SEQUENCE (SIZE(1..maxNrofSRS-
ResourceSets)) OF SRS-ResourceSetId            OPTIONAL,-- Need N
    srs-ResourceSetToAddModList                SEQUENCE (SIZE(1..maxNrofSRS-
ResourceSets)) OF SRS-ResourceSet                OPTIONAL,-- Need N
    srs-ResourceToReleaseList                  SEQUENCE (SIZE(1..maxNrofSRS-
Resources)) OF SRS-ResourceId                    OPTIONAL,-- Need N
    srs-ResourceToAddModList                   SEQUENCE (SIZE(1..maxNrofSRS-
Resources)) OF SRS-Resource                    OPTIONAL,-- Need N
```

TABLE 8-continued

```
  tpc-Accumulation                                  ENUMERATED {disabled}
                                                    OPTIONAL,-- Need S
  ...
}
SRS-ResourceSet ::=                                 SEQUENCE {
  srs-ResourceSetId                                   SRS-ResourceSetId,
  srs-ResourceIdList                                  SEQUENCE (SIZE(1..maxNrofSRS-
ResourcesPerSet)) OF SRS-ResourceId                       OPTIONAL, -- Cond Setup
  resourceType                                        CHOICE {
    aperiodic                                           SEQUENCE {
      aperiodicSRS-ResourceTrigger                        INTEGER (1..maxNrofSRS-
TriggerStates-1),
      csi-RS                                               NZP-CSI-RS-ResourceId
OPTIONAL, -- Cond NonCodebook
      slotOffset                                          INTEGER (1..32)
OPTIONAL, -- Need S
      ...,
      [[
      aperiodicSRS-ResourceTriggerList                     SEQUENCE
(SIZE(1..maxNrofSRS-TriggerStates-2))
                                                                 OF INTEGER
(1..maxNrofSRS-TriggerStates-1)   OPTIONAL   -- Need M
      ]]
    },
    semi-persistent                                     SEQUENCE {
      associatedCSI-RS                                    NZP-CSI-RS-ResourceId
OPTIONAL, -- Cond NonCodebook
      ...
    },
    periodic                                            SEQUENCE {
      associatedCSI-RS                                    NZP-CSI-RS-ResourceId
OPTIONAL, -- Cond NonCodebook
      ...
    }
  },
  usage                                               ENUMERATED
{beamManagement, codebook, nonCodebook, antennaSwitching},
  alpha                                               Alpha
OPTIONAL, -- Need S
  p0                                                  INTEGER (-202..24)
OPTIONAL, -- Cond Setup
  pathlossReferenceRS                                 PathlossReferenceRS-Config
OPTIONAL, -- Need M
  srs-PowerControlAdjustmentStates                  ENUMERATED { sameAsFci2,
separateClosedLoop}                                       OPTIONAL, -- Need S
  ...,
  [[
  pathlossReferenceRSList-r16                       SetupRelease
{ PathlossReferenceRSList-r16}
OPTIONAL    -- Need M
  ]]
}
PathlossReferenceRS-Config ::=                      CHOICE {
  ssb-Index                                             SSB-Index,
  csi-RS-Index                                          NZP-CSI-RS-ResourceId
}
SRS-PosResourceSet-r16 ::=                            SEQUENCE {
  srs-PosResourceSetId-r16                              SRS-PosResourceSetId-r16,
  srs-PosResourceIdList-r16                             SEQUENCE
(SIZE(1..maxNrofSRS-ResourcesPerSet)) OF SRS-PosResourceId-r16
OPTIONAL, -- Cond Setup
  resourceType-r16                                      CHOICE {
    aperiodic-r16                                         SEQUENCE {
      aperiodicSRS-ResourceTriggerList-r16                 SEQUENCE
(SIZE(1..maxNrofSRS-TriggerStates-1))
                                                                 OF INTEGER
(1..maxNrofSRS-TriggerStates-1)                           OPTIONAL, -- Need M
      ...
    },
    semi-persistent-r16                                  SEQUENCE {
      ...
    },
    periodic-r16                                          SEQUENCE {
      ...
    }
  },
  alpha-r16                                             Alpha
OPTIONAL, -- Need S
  p0-r16                                                INTEGER (-202..24)
OPTIONAL, -- Cond Setup
```

TABLE 8-continued

```
  pathlossReferenceRS-Pos-r16                    CHOICE {
    ssb-IndexServing-r16                            SSB-Index,
    ssb-Ncell-r16                                   SSB-InfoNcell-r16,
    dl-PRS-r16                                       DL-PRS-Info-r16
  }
OPTIONAL, -- Need M
  ...
}
SRS-SpatialRelationInfo ::=            SEQUENCE {
  servingCellId                          ServCellIndex
  OPTIONAL,   -- Need S
  referenceSignal                        CHOICE {
   ssb-Index                               SSB-Index,
   csi-RS-Index                            NZP-CSI-RS-ResourceId,
   srs                                       SEQUENCE {
        resourceId                              SRS-ResourceId,
        uplinkBWP                               BWP-Id
   }
  }
}
SRS-SpatialRelationInfoPos-r16 ::=         CHOICE {
  servingRS-r16                                 SEQUENCE {
    servingCellId                                 ServCellIndex
OPTIONAL,   -- Need S
    referenceSignal-r16                          CHOICE {
      ssb-IndexServing-r16                          SSB-Index,
      csi-RS-IndexServing-r16                       NZP-CSI-RS-ResourceId,
      srs-SpatialRelation-r16                      SEQUENCE {
        resourceSelection-r16                         CHOICE {
          srs-ResourceId-r16                             SRS-ResourceId,
          srs-PosResourceId-r16                          SRS-
PosResourceId-r16
        },
        uplinkBWP-r16                                    BWP-Id
      }
    }
  },
  ssb-Ncell-r16                                 SSB-InfoNcell-r16,
  dl-PRS-r16                                     DL-PRS-Info-r16
}
SRS-ResourceId ::=                          INTEGER (0..maxNrofSRS-Resources-1)
```

In Table 8, usage represents a higher layer parameter which indicates whether an SRS resource set is used for beam management or is used for codebook-based or non-codebook-based transmission. A usage parameter corresponds to a L1 parameter 'SRS-SetUse'. 'spatialRelationInfo' is a parameter which represents a configuration of a spatial relation between a reference RS and a target SRS. Here, the reference RS may be SSB, CSI-RS, or SRS corresponding to the L1 parameter 'SRS-Spatial Relation-Info'. Above, usage is set for each SRS resource set. If SRS is set by 'SRS-PosResourceSet-r16', the reference RS may correspond to a DL PRS (Positioning reference signal), and usage may be configured for each SRS resource set.

A terminal determines a Tx beam for an SRS resource which will be transmitted based on SRS-SpatialRelation Info included in the SRS-Config IE (S1020). Here, SRS-SpatialRelation Info is configured per SRS resource and represents whether the same beam as a beam used in a SSB, a CSI-RS or a SRS will be applied per SRS resource. In addition, SRS-SpatialRelationInfo may be configured or may not be configured for each SRS resource.

If SRS-SpatialRelationInfo is configured for an SRS resource, the same beam as a beam used in a SSB, a CSI-RS or a SRS is applied and transmitted. But, if SRS-SpatialRelationInfo is not configured for an SRS resource, the terminal randomly determines a Tx beam and transmits an SRS through the determined Tx beam (S1030).

In more detail, for a P-SRS that 'SRS-ResourceConfigType' is configured as 'periodic':

i) if SRS-SpatialRelationInfo or SRS-PosResource-r16 is set to 'SSB/PBCH', the UE may transmit the corresponding SRS resource by applying a spatial domain transmission filter that is the same as (or generated from) the spatial domain Rx filter used for reception of SSB/PBCH: or ii) if SRS-SpatialRelationInfo or SRS-PosResource-r16 is set to 'CSI-RS', the UE may transmit the SRS resource by applying the same spatial domain transmission filter used for reception of periodic CSI-RS or SP (semi-persistent) CSI-RS; or iii) if SRS-SpatialRelationInfo or SRS-PosResource-r16 is set to 'SRS', the UE may transmit the corresponding SRS resource by applying the same spatial domain transmission filter used for periodic SRS transmission.

iv) If spatial RelationInfoPos-r16 is set to 'PRS', the UE may transmit the corresponding SRS resource by applying the same spatial domain transmission filter used for reception of DL PRS.

Although 'SRS-ResourceConfigType' is configured as 'SP (semi-persistent)-SRS' or 'AP (aperiodic)-SRS', a beam determination and transmission operation may be applied in a way similar to the above.

Additionally, a terminal may receive or may not receive a feedback on an SRS from a base station as in the following three cases (S1040).

i) when Spatial_Relation_Info is configured for all SRS resources in a SRS resource set, a terminal transmits an SRS with a beam indicated by a base station. For example, when Spatial_Relation_Info indicates all the same SSB, CRI or SRI, a terminal repetitively transmits an SRS with the same beam. This case corresponds to FIG. 13(*a*) as a usage for a base station to select an Rx beam.

ii) Spatial_Relation_Info may not be configured for all SRS resources in an SRS resource set. In this case, a terminal may transmit with freely changing SRS beams. In other words, this case corresponds to FIG. 13(*b*) as a usage for a terminal to sweep Tx beams.

iii) Spatial_Relation_Info may be configured only for a part of SRS resources in an SRS resource set. In this case, for a configured SRS resource, an SRS may be transmitted with an indicated beam, and for a SRS resource that Spatial_Relation_Info is not configured an SRS may be transmitted by randomly applying a Tx beam by a terminal.

BM Procedure in Improved Wireless Communication System

To ensure flexibility in beam indication in a basic wireless communication system, beams are separately indicated for each DL/UL channel/RS resource, and the indication method may be configured for each channel/RS.

In the case of the above indication method, in order to change the serving beam of multiple terminals that communicate with the base station using a single beam, the base station must indicate each terminal to change the beam for each channel/RS resource. Accordingly, there is a problem that signaling overhead may increase and beam change latency may increase.

In addition, since UL power control-related parameters (e.g., pathloss RS (PL RS)) must be changed for each UL channel/RS along with the UL beam change, signaling overhead/latency problems existed.

To resolve the problem, in improved wireless communication system, i) default spatial relation/PL RS configuration, ii) multi-CC simultaneous TCI/spatial relation update, iii) PUCCH resource group configuration based on spatial relation update, iv) MAC CE based spatial relation indication for aperiodic/semi-persistent SRS, and v) MAC CE based PL RS update for aperiodic/semi-persistent SRS and PUSCH may be applied.

Additionally, in an improved wireless communication system, the base station may configure not only RS for channel measurement but also resources for interference measurement for the terminal. The UE may measure the L1-SINR for the configured channel measurement RS and interference measurement resources, and report one or more RSs corresponding to one or more L1-SINRs with a larger value among the measured L1-SINRs.

In addition, a method described later may be applied to configure/indicate a beam in a channel/RS integrated manner for a terminal operating with a single serving beam. Hereinafter, a TCI that configures/indicates a beam in an integrated channel/RS manner for the UE will be referred to as a unified TCI state.

Specifically, the DL unified TCI state may indicate which QCL type-D RS applies for the PDCCH, PDSCH, or/and CSI-RS resources, and the UL unified TCI state may indicate the spatial relation RS (and/or PL RS) applied for PUCCH, PUSCH, and/or SRS resources.

In addition, for a UE for which beam correspondence is established (as with the default spatial relation/PL RS), since the UL spatial relation and PL RS may also be matched with the DL beam RS, the unified TCI state may be applied to both channels/RS of DL/UL. The unified TCI state that can be applied to all DL/UL channels/RS is called the joint DL/UL TCI state, and the following two modes can be supported.

i) Joint DL/UL TCI configuration/indicating mode: DL RS configured/indicated by Joint TCI state may be applied as QCL type-D RS for DL channels/RSs. As another example, the DL RS configured/indicated by the Joint TCI state may also be applied as a spatial relation RS (or/and PL RS) for UL channels/RSs. That is, when an update to the joint TCI state is indicated, the beam RS (or/and PL RS) for the corresponding DL channels/RSs and UL channels/RSs may be changed together.

ii) Separate DL and UL TCI setup/indication modes: QCL type-D source RS for DL channels/RSs is configured/indicated by DL TCI state, and the spatial relation RS (or/and PL RS) for UL channels/RSs may be configured/indicated by the UL TCI state. Here, the DL TCI state and UL TCI state may be configured/indicated separately.

The joint DL/UL TCI status may be indicated/updated through MAC-CE and/or DCI. Specifically, one or more TCI state(s) among a plurality of TCI states (i.e., TCI state pool) established by RRC signaling may be activated by MAC-CE.

When multiple TCI states are activated by MAC-CE, one TCI state among the multiple TCI states may be indicated by DCI. One TCI state among a plurality of TCI states may be indicated by DL DCI format (DCI format 1-1/1-2) (or/and DCI without PDSCH scheduling). If the DCI does not include PDSCH scheduling information, the UE may transmit an ACK for the DCI to the base station (similar to the DCI-based SPS release method).

Additionally, the UE may measure and report the optimal beam RS for each TRP. To this end, the base station may divide the beam measurement RS set/group into one or more sub-sets/sub-groups and configure them for the UE. The UE may select one or more RS(s) for each sub-set/sub-group, and report the selected RS to the base station along with its quality values (L1-RSRP, [L1-SINR]).

Operation of a Terminal Equipped with a Plurality of Panels

The operation of a UE with a plurality of panels in an improved wireless communication system has been defined/configured. In describing the present disclosure, ‘Panel’ may correspond to a set of antenna elements, a set of antenna ports, a set of RS/channel resources, a set of antenna/beam related resources related to a specific logical index. TCI state/spatial relation RS/QCL RS/pathloss set of RSs, a set of target channel/RS resources to which a specific beam/precoder related instruction is applied, etc.

Specifically, a panel entity may correspond to one or more RS resources (indexes). As an example, in the case of CSI/beam reporting, the one or more RS resources may be RSs related to measurement and/or reporting.

That is, the panel entity may correspond to the CSI-RS and/or SSB resource index reported in the beam reporting instance. The correspondence between the panel entity and the reported CSI-RS and/or SSB resource index may be known by the base station. And, the correspondence between the CSI-RS and/or SSB resource index and the panel entity may be determined by the UE.

The UE may report capability information related to the maximum number of SRS ports and coherence type for each panel entity to the base station. Multiple codebook-based SRS resource sets with different maximum numbers of SRS ports may be configured/supported for the UE. Here, the indicated SRI is based on SRS resources corresponding to one SRS resource set, and the SRS resource set may be aligned with the terminal capabilities for the panel entity.

As another example, the RS resource for beam indication may be a source RS for UL TX spatial filter information. The panel entity corresponding to one RS resource may be different and controlled by the terminal. Additionally, RS resources may be mapped to one or more panels, and one or more RS resources may correspond to one or more RS resource sets.

And, for measurement of DL and/or UL beams (e.g., DL measurement RS reception, SRS transmission, etc.), L panels among the P panels of available terminals may be activated. And, for UL transmission, one of the L activated terminal panels may be selected.

Here, the UE may report a supported UL rank list (i.e., number of UL transport layers), a list of the number of supported SRS antenna ports, and a list of coherence types indicating a subset of ports. The base station may establish an association between the UL rank index and the rank/number/coherence type of the SRS antenna port for the UE.

Additionally, for quick UL panel selection of the UE, Multiphase extraction (MPE) mitigation, TCI state updates, UE power saving, UL interference management, support for various settings across panels, UL M-TRP case may be assumed/applied.

For example, TCI state updates (based on MCE CE or/and DCI) may be used for panel selection of the UE. Here, the UE may report information about at least one panel (e.g., the state of the panel (e.g., inactive or not, whether the panel for DL/UL measurements is activated or not, whether the panel dedicated to DL/UL reception is activated, etc.)) provided in the UE. Additionally, linking/association between UE panels such as CSI-RS/SSB resources or resource sets, SRS resource sets and/or PUCCH resource groups, etc. may be supported.

And, the UE may report a list of terminal capability value sets (for UE panel activation and selection). Each UE capability value set may be configured with the maximum number of SRS ports supported. At least one capability value may be different for two different sets of UE capability values, but is not limited to this and may be the same. The UE capability value set may be common across all BWP/CCs in the same band, but is not limited to this.

The correspondence between each reported CSI-RS and/or SSB resource index and one of the UE capability value sets in the reported list is determined by the UE and may be notified to the base station in the beam report instance.

The index of the UE capability value set is reported along with the SSBRI/CRI and L1-RSRP/SINR pair (e.g., up to 4 pairs, with 7 bits of absolute value and 4 bits of differential) in the beam reporting UCI, and at least one of the two options below may be applied.

Option 1: The UE may report one index for all CRI/SSBRI reported in one beam report.

Option 2: The UE may report one index for each CRI/SSBRI reported in one beam report.

As described above, a UE capability value set index (hereinafter, C-ID) is defined, and the UE may report UE capability information including information indicating how many C-IDs it has to the base station. Here, the attribute included/corresponding to the C-ID may be the maximum number of SRS ports supported by the UE for each C-ID.

In describing the present disclosure, a capability value set index (C-ID) may also be expressed as an index (ID).

For example, assume that panel #0 (2 ports), panel #1 (2 ports), panel #2 (4 ports), and panel #3 (4 ports) are configured for a UE (having a total of 4 panels). Here, panel #0) and panel #1 may be mapped to C-ID #0, and panel #2 and panel #3 may be mapped to C-ID #1. The UE may report C-ID #0 along with information indicating that the maximum number of SRS ports supported is 2, and C-ID #1 along with information indicating that the maximum number of SRS ports supported is 4 to the base station.

That is, the UE may transmit the C-ID and related terminal capability information (e.g., maximum number of SRS ports) to the base station as a report on the panel type.

Additionally or alternatively, a C-ID may be assigned/corresponding to each panel having the same number of SRS ports.

For example, assume that C-ID #0 (port 2) is mapped to panel #0, C-ID #1 (2 ports) is mapped to panel #1. C-ID #2 (2 ports) is mapped to panel #2, and C-ID #3 (2 ports) is mapped for panel #3. Here, the UE may report four C-IDs (i.e., C-ID #0 to C-ID #3).

That is, the UE may transmit the C-ID and related terminal capability information (e.g., maximum number of SRS ports) to the base station as a report on the panel type.

Additionally or alternatively, the UE may include the C-ID reported as a UE capability in the beam report and report it (instantaneously/periodically) to the base station.

For convenience of description of the present disclosure, the above-described reporting method (e.g., C-ID reporting method) will be called 'panel-specific beam reporting'.

If panel-specific beam reporting and/or the BM procedure described above (e.g., beam reporting according to the BM procedure in basic/enhanced wireless communication systems) is established, the UE may report the index(s) of the RS (e.g., CRI or SSBRI) related to the best N base station Tx beams (regardless of the Rx panel) to the base station along with the reception quality value of the corresponding RS (e.g., L1-RSRP or/and L1-SINR).

Here, N is a value between 1 and 4 and may be configured by the base station. And, the index of the RS related to the best N base station Tx beams may mean the N RSs with the highest reception quality values among a plurality of RSs related to the base station Tx beams.

That is, the panel-specific beam reporting scheme may include reporting the L1-RSRP/L1-SINR(s) associated with the CRI/SSBRI(s) and the optimal C-ID (for each CRI/SSBRI). Here, a mode/method of individually reporting C-ID for each CRI/SSBRI and/or a mode/method of reporting a single C-ID for all CRI/SSBRI may be applied.

On the other hand, since C-ID is linked to the terminal capability value for UL transmission properties, if a panel that can only receive (i.e., DL only panel(s)) exists in the UE, there may be a problem that the panel-specific beam reporting method described above cannot be utilized.

In order to solve the above problem, when a panel-specific beam reporting method is configured/indicated, the UE may be configured/defined/indicated (for some CRI/SSBRI(s)) to optionally report a reserved ID (or reserved bit/bit sequence, etc.) instead of the C-ID.

Here, if the best panel for a specific CRI/SSBRI measured, selected, and reported by the UE corresponds to the DL/Rx only panel, the UE may report the reserved ID instead of the C-ID. This may be interpreted as the UE reporting that the corresponding CRI/SSBRI does not correspond to any of the one or more C-IDs reported from the UL perspective.

Although the base station that has received the above information (i.e., reserved ID) is suitable to configure/ indicate the corresponding CRI/SSBRI as a source RS for the DL beam, it can be seen that it is inappropriate to configure/indicate as a source RS for the UL beam (or/and PL RS).

The source RS for the DL beam may include a QCL reference RS (i.e., an RS associated with QCL type D) and/or an RS indicated/configured by the DL TCI state. The source RS for the UL beam (or/and PL RS) may include a spatial relation RS, a PL reference RS, and an RS indicated/set by the UL TCI state.

However, in order to utilize the above-described method, a separate reserved ID must be defined on the C-ID field of UCI, and the number/size of the C-ID field may increase accordingly. In particular, if the number of C-IDs of the UE is a power of 2 (e.g., 21, 22), 1 or 2 bits of the C-ID field may be sufficient. However, in order to define a reserved ID, definition of an additional bit (e.g., 1 bit) may be required in the C-ID field.

Depending on the UE implementation, DL only panel(s) may not exist, but since the base station does not have information about the presence or absence of a DL only panel on the terminal, the UCI payload may be unnecessarily increased.

Hereinafter, a beam reporting method considering a panel that cannot transmit will be described.

Figure 15:
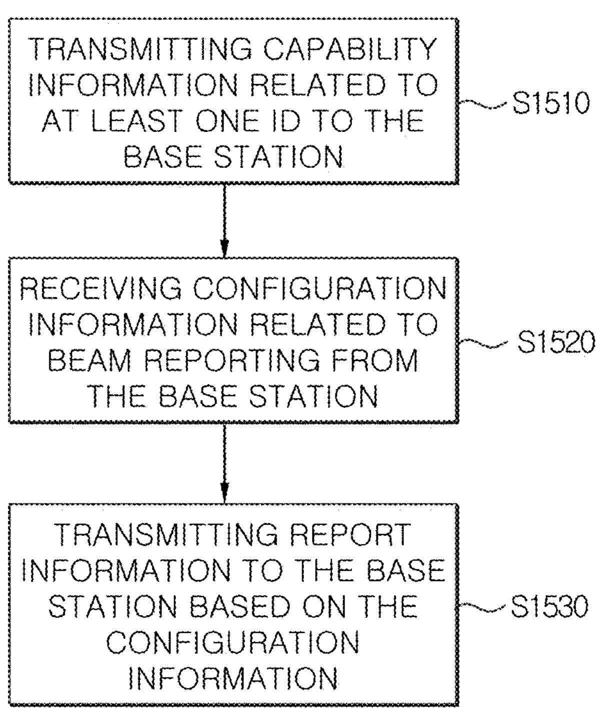
FIG. 15 is a flowchart for describing a method by which a terminal performs uplink transmission, according to an embodiment of the present disclosure.

FIG. 15 is a flowchart for describing a method by which a terminal performs uplink transmission, according to an embodiment of the present disclosure.

The UE may transmit capability information related to at least one index (capability value index, ID) to the base station (S1510).

As an example, the UE may report how many IDs it has as capability information to the base station. Additionally, the maximum number of SRS ports supported by the UE may be configured for each ID. Accordingly, the UE may report to the base station at least one ID with the maximum number of SRS ports supported.

The UE may receive configuration information related to beam/CSI reporting from the base station (S1520).

Here, the beam report may include uplink control information (UCI) related to at least one of L1-RSRP or L1-SINR.

As an example, configuration information related to beam/CSI reporting may include at least one of information related to the timing (e.g., slot offset) and periodicity at which reporting information will be transmitted, information related to ID reporting, or the type of indicator of at least one DL RS resource.

Additionally or alternatively, configuration information related to beam/CSI reporting may include measurement values to report (e.g., L1-RSRP or/and L1-SIN), number of CRI/SSBRI to report, report type, etc.

The UE may transmit report information to the base station based on the configuration information (S1530).

Here, the indicator of the at least one DL RS resource may include at least one of a CSI-RS resource indicator or a synchronization signal (SS)/physical broadcast channel (PBCH) resource block indicator. And, the indicator of the at least one DL RS resource may correspond to the optimal beam (i.e., the beam with the highest quality information).

And, the UE may receive a message for triggering or activation of beam reporting from the base station. That is, the UE may transmit reporting information to the base station based on configuration information and a message for triggering or activation.

In addition, the reporting information may include an indicator of at least one downlink (DL) reference signal (RS) resource, and a specific ID for the indicator of the at least one DL RS resource among the at least one C-ID.

Here, the capability information corresponding to at least one ID may include information related to the maximum number of SRS ports supported by the UE. Capability information corresponding to a specific ID may include information indicating that the maximum number of SRS ports supported by the UE is 0 and/or information indicating that the maximum number of SRS ports is not applicable.

That is, if the indicator of at least one DL RS resource corresponds to the DL/Rx only panel of the UE, the UE may transmit to the base station capability information corresponding to a specific ID (i.e., ID for the indicator of the at least one DL RS resource) indicating that the maximum number of SRS ports supported is 0 or that the maximum number of SRS ports cannot be applied.

The base station may determine that the indicator of at least one DL RS resource is suitable as a source RS for a DL beam, but is unsuitable as a source RS for a UL beam, through capability information corresponding to a specific ID.

Accordingly, although at least one DL RS corresponding to a specific ID may be configured as a QCL source RS by the DL TCI state, it may not be configured to spatial relation RS, pathloss reference RS, and UL source RS according to UL TCI state.

In addition, the reporting information may include an L1-RSRP (Reference Signals Received Power) value or/and an L1 (layer 1)-SINR (Signal to Interference plus Noise Ratio) value corresponding to the indicator of at least one DL RS resource.

And, the reporting information may be composed of part 1 and part 2. The payload size of part 1 is fixed, and the payload size of part 2 can be determined based on the information included in part 1.

For example, part 1 may include at least one of information indicating whether an indicator of at least one DL RS, information indicating whether to report ID, number of IDs to be reported for indicator of at least one DL RS, L1-RSRP, and L1-SINR values are reported. Part 2 may include LI-RSRP and L1-SINR for a specific ID or the at least one DL RS.

Figure 16:
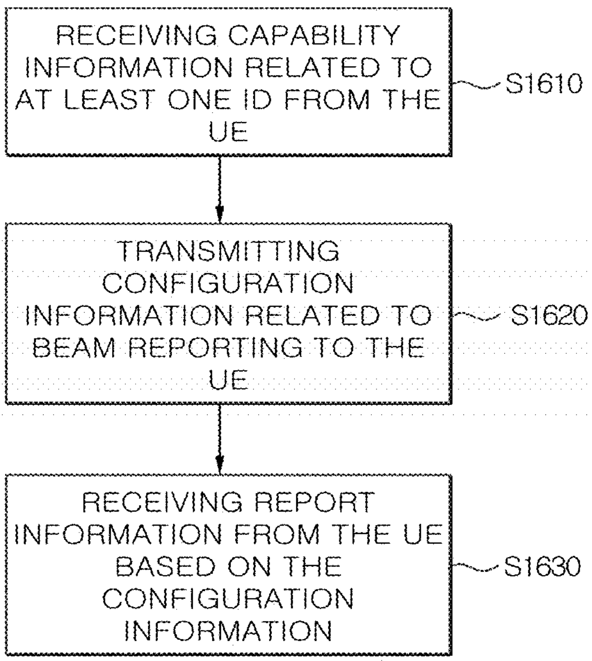
FIG. 16 is a flowchart illustrating a method by which a base station performs uplink reception, according to an embodiment of the present disclosure.

FIG. 16 is a flowchart illustrating a method by which a base station performs uplink reception, according to an embodiment of the present disclosure.

The base station may receive capability information related to at least one ID from the UE (S1610). Capability information related to C-ID has been described with reference to S1510, so redundant description will be omitted.

The base station may transmit configuration information related to beam reporting to the UE (S1620). The base station may transmit a triggering/activation message to the UE in order to trigger/activate the UE's beam reporting.

The base station may receive reporting information based on configuration information (or/and a message for triggering/activating beam reporting) from the terminal (S1630).

Here, the report information may include an indicator of at least one DL RS resource, and a specific ID for the indicator of at least one DL RS resource among the at least one ID.

Additionally, the capability information corresponding to a specific ID may include information indicating that the maximum number of SRS ports supported by the UE is 0 or that the maximum number of SRS ports is not applicable.

Here, the base station may determine that the indicator of at least one DL RS resource is suitable as a source RS for the DL beam, but is unsuitable as a source RS for the UL beam, through the capability information corresponding to the specific ID. That is, the base station may determine that the panel corresponding to the indicator of at least one DL-RS resource is a DL/Rx only panel.

Hereinafter, the beam reporting method considering a panel that cannot transmit will be described in more detail.

Embodiment 1

The UE may report C-ID for DL/Rx only panel(s). For this purpose, the UE may be configured/defined/indicated/allowed to report that 'maximum number of SRS ports=0' or 'maximum number of SRS ports value is not applicable (N/A)' as a UE capability for C-ID.

When the method according to Embodiment 1 described above is applied, there is no need to define a separate reserved ID in the C-ID field of UCI, and the panel-specific beam reporting method can be used even if a DL/Rx only panel exists in the UE.

Specifically, when reporting C-ID related UE capabilities, the UE may report a separate C-ID and corresponding UE capabilities for the DL/RX only panel (i.e., terminal capability indicating that 'maximum number of SRS ports=0' or 'maximum number of SRS ports value is not applicable, N/A') to the base station.

When reporting a panel-specific beam, if it is determined that it is optimal to receive specific or all CRI/SSBRI through DL/RX only panel, the UE may report the corresponding C-ID (e.g., C-ID related to terminal capabilities indicating 'maximum number of SRS ports=0' or 'maximum number of SRS ports value is not applicable (N/A')) to the base station.

Although the base station that received the corresponding C-ID according to the panel-specific beam report is suitable for configuring/indicating the CRI/SSBRI as the source RS for the DL beam, it may be seen that it is unsuitable for configuring/indicating as a source RS for the UL beam.

The source RS for the DL beam may include a QCL reference RS (i.e., an RS associated with QCL type D) and/or an RS indicated/set by the DL TCI state. The source RS for the UL beam (or/and PL RS) may include a spatial relation RS, a PL reference RS, and an RS indicated/set by the UL TCI state.

Embodiment 1-1

As in Embodiment 1, when the UE reports C-ID for DL/Rx only panel(s), two part encoding may be applied. In a wireless communication system. UCI encoding is performed with single part encoding for the beam reporting method, but two part encoding may be used for the CSI reporting method.

When two part encoding is applied, the UCI payload may be encoded into a part with a fixed payload size and a part with a variable payload size.

Specifically, when the UCI payload size may vary depending on the reported information of the UE (for example, when the payload size of PMI is variable depending on the RI information reported by the terminal), the UCI payload may be encoded by being separated into a part (part 1) with a fixed payload size regardless of the UE report information and a remaining report information part (part2) with a variable payload size depending on part 1 information.

When two part encoding is performed, the base station may first complete decoding of part 1 information, identify the payload size of part 2 through part 1 information, and then decode part 2 information. In other words, when two part encoding is performed, there is an advantage that blind decoding does not have to be performed several times because the payload size is not known.

The two part encoding method can also be applied to Example 1. Specifically, the UE may encode information about whether to report a C-ID and/or the number of C-IDs to be reported for N CRI(s)/SSBRI(s) by including them (with CRI/SSBRI/RSRP/SINR) in part 1 (of UCI). The UE may encode information related to C-ID(s) with properties that can be changed by the information included in part 1 as part 2. And, the UE may report information consisting of part 1 and part 2 to the base station.

If the UE believes that a particular panel/C-ID is only meaningful from a UL transmission perspective and does not prefer to use it as a DL panel (or, if the DL measurement value is below a certain threshold or the quality is poor above a certain value compared to other DL beams/panels/C-IDs), the UE may omit the RSRP/SINR value and perform panel-specific beam reporting.

Here, the payload size of the RSRP/SINR report value may also be varied, so the UE may encode it by including information about whether to report RSRP/SINR values and/or how many RSRP/SINR to report for N CRI(s)/SSBRI(s) (along with information on whether the above C-IDs are to be reported and/or number of C-IDs to be reported for N CRI(s)/SSBRI(s) and/or CRI/SSBRI information) in part 1.

And, if reporting by omitting the C-ID (or reporting a reserved ID/bit/bit field) or/and if the UE capability for the reported C-ID corresponds to 'maximum number of SRS ports=0' or 'value of maximum number of SRS ports is not applicable', it may be interpreted as 'preferring that the corresponding CRI/SSBRI be used as DL beam/TCI/QCL RS' or 'not preferring that CRI/SSBRI be used as UL beam/TCI/spatial relation RS (and PL RS)'.

Embodiment 2

Embodiment 1 is a method of assigning a C-ID to a DL/Rx only panel, and Embodiment 2 relates to a method of supporting a DL/Rx only panel by modifying the panel-specific beam reporting method without assigning a C-ID to the DL/Rx only panel (In other words, C-ID is given only to panels capable of UL transmission).

If a DL/Rx only panel is preferred from a DL reception perspective for a specific DL beam RS (e.g., CRI/SSBRI), the UE may repeatedly report the CRI/SSBRI and the specific C-ID.

Here, regarding the quality values (L1-RSRP/SINR) for CRI/SSBRI and C-ID with repeated reporting, the UE may (once) report the (best) reception quality value when measuring the DL beam RS using the DL/Rx only panel. In addition, the UE may (once again) report the reception quality value when measuring the DL beam RS through the panel (one of the panels) capable of both transmission and reception belonging to the corresponding C-ID.

Here, "Specific C-ID" is a C-ID randomly selected by the UE among panel/C-IDs capable of both transmission and reception, or a C-ID corresponding to the receiving and/or transmitting panel that is optimal (or corresponding to the best quality value) for the CRI/SSBRI.

For example, assume that the UE has one DL only panel (i.e., panels without assigned C-ID), one panel with 2 ports (e.g., a panel assigned C-ID #0), and one panel with 4 ports (e.g., a panel assigned C-ID #1).

In addition, when performing panel-specific beam reporting, it is assumed that the UE measures the optimal quality (e.g., L1-RSRP=−80 dB) for CRI #0 when receiving CRI #0 through the DL only panel.

If the L1-RSRP for CRI #0 is −100 dB when receiving the corresponding CRI #0 through a 2-port panel, the UE may transmit both i) (CRI #0, C-ID #0, L1-RSRP=−80 dB) and ii) (CRI #0, C-ID #0, L1-RSRP=−100 dB) to the base station.

Here, ii) information may indicate that a better quality value is measured than when receiving CRI #0 through a 4-port panel (i.e., C-ID #1).

The base station that received i) and ii) information may obtain information that the UE has a DL only panel through CRI and C-ID repetition, and/or may determine that it is better to use CRI #0 in the DL TCI state (or RS set by the DL TCI state) based on i) information.

Additionally or alternatively, based on ii) information, the base station may determine that it is better (than when using C-ID #1) to use CRI #0 not only for DL TCI state but also for UL TCI/spatial relation RS/PL RS.

That is, Embodiment 2 relates to a method of implicitly conveying information about the DL only panel to the base station by repeatedly reporting the same CRI/SSBRI and C-ID to the base station.

In the above-described method, from a DL perspective, information related to the optimal beam (e.g., information related to CRI/SSBRI) may be reported to the base station, but from a UL perspective, information related to the optimal beam (e.g., information related to CRI/SSBRI) may not be reported to the base station.

Accordingly, the UE may report each of CRI/SSBRI (or/and C-ID) from a DL/Rx perspective and CRI/SSBRI (or/and C-ID) from a UL/Tx perspective (or a perspective that performs both UL/DL transmission and reception) to the base station.

Here, the number of RSs to be reported from each perspective (i.e., DL/Rx perspective and UL/Tx perspective (or perspective performing both UL/DL transmission and reception) may be configured by the base station. Also, since the UE may select a panel from a DL/Rx perspective, C-ID reporting may be omitted.

When CRI/SSBRI and beam quality values from a DL/Rx perspective are reported together/separately, for CRI/SSBRI reported from the UL/Tx perspective, reporting of reception quality values (e.g., L1-RSRP/SINR) may be configured/defined/indicated to be omitted.

Additionally or alternatively, panels from a UL/Tx perspective may generally also be used as DL/Rx panels. Therefore, in order to use the corresponding panel for both DL and UL transmission and reception, the UE may be configured/defined/indicated to report reception quality values (e.g., L1-RSRP/SINR).

Figure 17:
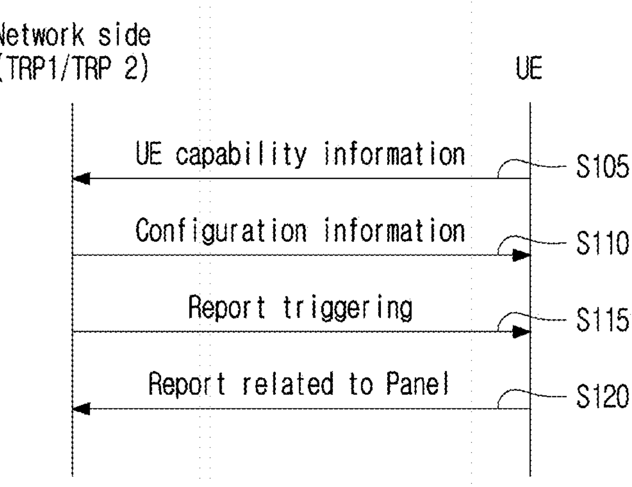
FIG. 17 is a diagram for describing a signaling process according to an embodiment of the present disclosure.

FIG. 17 is a diagram for describing the signaling procedure of the network side and the UE according to an embodiment of the present disclosure.

FIG. 17 shows an example of signaling between a network side and a terminal (UE) in an M-TRP situation to which the Embodiments (e.g., Embodiment 1, Embodiment 1-1. Embodiment 2, or a combination of one or more of the detailed Embodiments) of the present disclosure described above may be applied.

Here, the UE/network side is an example and may be replaced with various devices as described with reference to FIG. 18. FIG. 17 is for convenience of explanation and does not limit the scope of the present disclosure. Additionally, some step(s) shown in FIG. 17 may be omitted depending on the situation and/or settings. Additionally, in the operation of the network side/UE in FIG. 17, the above-described uplink transmission and reception operation, M-TRP-related operation, etc. may be referenced or used.

In the following description, the network side may be one base station including a plurality of TRPs, or may be one cell including a plurality of TRPs. Alternatively, the network side may include a plurality of remote radio heads (RRHs)/remote radio units (RRUs).

For example, an ideal/non-ideal backhaul may be established between TRP 1 and TRP 2 constituting the network side. In addition, although the following description is based on a plurality of TRPs, this may be equally extended and applied to transmission through a plurality of panels/cells, and may also be extended and applied to transmission through a plurality of RRHs/RRUs.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., a CORESET index, an ID).

In an example, when one UE is configured to perform transmission and reception with a plurality of TRPs (or cells), it may mean that a plurality of CORESET groups (or CORESET pools) are configured for one terminal. A configuration on such a CORESET group (or a CORESET pool) may be performed through higher layer signaling (e.g., RRC signaling, etc.).

In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

The UE may transmit terminal capability information to the network (S105). As an example, UE capability information may include information related to a UE capability value set. Here, the UE capability value may include information about the maximum number of SRS ports that the UE may support.

As an example, a UE with a DL/Rx only panel may report to the network that the maximum number of SRS ports that can be supported for specific C-ID(s) is 0 (or that the maximum number of SRS ports is not applicable).

For example, the operation in which the UE (100 or 200 in FIG. 18) in step S105 described above transmits UE capability information to the network side (200 or 100 in FIG. 18) can be implemented by the device in FIG. 18, which will be described below. For example, referring to FIG. 18, one or more processors 102 may control one or more transceivers 106 and/or one or more memories 104 to receive the UE capability information, and one or more transceivers 106 may receive the UE capability information from the network side.

The UE may receive configuration information from the network (S110).

For example, the configuration information may include information related to network-side configuration (i.e., TRP configuration), resource allocation information related to M-TRP-based transmission and reception, etc. The configuration information may be transmitted through a higher layer (e.g., RRC, MAC CE). The configuration information may include information related to uplink transmission based on a configured grant (CG). Additionally, if the setting information is defined or configured in advance, the corresponding step may be omitted.

As another example, the configuration information may include beam and panel related reporting information.

The beam and panel-related reporting information may include at least one of information on the number of CRI (s)/SSBRI(s), and which measurements to report (e.g., whether to report L1-RSRP or L1-SINR), a report type (e.g., aperiodic report, semi-persistent report on PUSCH, semi-persistent report on PUCCH), information relating to periodic reporting (e.g. periodic report), reporting frequency, and timing of reporting (e.g. periodicity), slot offset, etc.) and an indicator indicating whether to report the C-ID together.

The configuration information may be configured for the terminal through at least one of an RRC message, MAC-CE message, or DCI. The configuration information may be configured in the form of an existing information element (IE) and/or field, or may be configured in the form of a newly defined IE and/or a newly defined field.

For example, the operation of the terminal (100 or 200 in FIG. 18) in step S110 described above receiving configuration information from the network side (200 or 100 in FIG. 18) may be implemented by the device in FIG. 18, which will be described below. For example, referring to FIG. 18, one or more processors 102 may control one or more transceivers 106 and/or one or more memories 104 to receive the configuration information, and one or more transceivers 106 may receive the configuration information from a network side.

After beam and panel reporting-related settings (S110), the base station may perform a separate report triggering/activation indication (for semi-persistent or aperiodic reporting) to the terminal (S115).

For example, the operation of the UE (100 or 200 in FIG. 18) in step S115 described above to view the network side (200 or 100 in FIG. 18) and receive a triggering/activation instruction can be implemented by the device in FIG. 18, which will be described below. For example, referring to FIG. 18, Ine or more processors 102 may control one or more transceivers 106 and/or one or more memories 104, etc. to receive the report triggering/activation indications, and one or more transceivers 106 may receive the report triggering/activation indication from the network side.

The UE may periodically/non-periodically perform beam and panel reporting information according to the beam and panel reporting related configuration information (S110) (and triggering/activation indication) (S120).

Beam and panel related reporting information may include CRI(s)/SSBRI(s), L1-RSRP(s)/L1-SINR(s) (for CRI (s)/SSBRI(s), C-ID(s) (for each CRI/SSBRI).

For example, the operation of the UE (100 or 200 in FIG. 18) in step S120 described above transmitting beam and panel-related reporting information to the network side (200) or 100 in FIG. 18) can be implemented by the device of FIG. 18, which will be described below: For example, referring to FIG. 18, one or more processors 102 may control one or more transceivers 106 and/or one or more memories 104, etc. to transmit the beam and panel related reporting information, and one or more transceivers 106 may transmit the beam and panel related reporting information to the network side.

General Device to which the Present Disclosure May be Applied

FIG. 18 is a diagram which illustrates a block diagram of a wireless communication system according to an embodiment of the present disclosure.

In reference to FIG. 18, a first device 100 and a second device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method of performing uplink transmission by a user equipment (UE) in a wireless communication system, the method comprising:

transmitting, to a base station, capability information related to at least one index (ID);

receiving, from the base station, configuration information related to a beam report; and transmitting, to the base station, report information based on the configuration information, wherein the report information includes an indicator of at least one downlink (DL) reference signal (RS) resource, and a specific ID for the indicator of the at least one DL RS resource among the at least one ID, and wherein capability information corresponding to the specific ID includes information indicating that a maximum number of sounding reference signal (SRS) ports supported by the UE is 0 or information indicating that a maximum number of SRS ports is not applicable.

2. The method of claim 1, wherein:

the at least one DL RS corresponding to the specific ID is configured as a quasi co-located (QCL) source RS by a DL transmission configuration indicator (TCI) state.

3. The method of claim 1, wherein:

the at least one DL RS corresponding to the specific ID is not configured to a spatial relation RS, a pathloss reference RS, and an uplink (UL) source RS according to a UL transmission configuration indicator (TCI) state.

4. The method of claim 1, wherein:

the report information includes at least one of an layer 1 (L1)-reference signals received power (RSRP) value or an L1-signal to interference plus noise ratio (SINR) value corresponding to the indicator of the at least one DL RS resource.

5. The method of claim 1, wherein:

the report information consists of part 1 and part 2, wherein the part 1 includes at least one of the indicator of the at least one DL RS, information indicating whether to report an ID, number of IDs to be reported for the indicator of the at least one DL RS and information indicating whether layer 1 (L1)-reference signals received power (RSRP) and L1-signal to interference plus noise ratio (SINR) values are reported, and the part 2 includes L1-RSRP and L1-SINR for the specific ID or the at least one DL RS.

6. The method of claim 5, wherein:

a payload size of the part 1 is fixed, and a payload size of the part 2 is determined based on information included in the part 1.

7. The method of claim 1, wherein:

the configuration information includes at least one of information related to a timing and periodicity at which the report information will be transmitted, information related to ID reporting, or a type of indicator of the at least one DL RS resource.

8. The method of claim 1, wherein:

the indicator of DL RS resource includes at least one of a channel state information-reference signal (CSI-RS) resource indicator or a synchronization signal (SS)/physical broadcast channel (PBCH) resource block indicator.

9. The method of claim 1, wherein:

based on a message for triggering or activation of beam reporting being received from the base station, the report information is transmitted to the base station based on the configuration information and the message.

10. The method of claim 1, wherein:

the beam report includes uplink control information (UCI) related to at least one of layer 1 (L1)-reference signals received power (RSRP) or L1-signal to interference plus noise ratio (SINR).

11. The method of claim 1, wherein:

the capability information corresponding to the at least one ID includes information related to a maximum number of SRS ports supported by the UE.

12. A user equipment (UE) performing uplink transmission in a wireless communication system, the UE comprising:

at least one transceiver; and at least one processor connected to the at least one transceiver, wherein the at least one processor is configured to:

transmit, to a base station through the at least one transceiver, capability information related to at least one index (ID);

receive, from the base station through the at least one transceiver, configuration information related to a beam report; and transmit, to the base station through the at least one transceiver, report information based on the configuration information, wherein the report information includes an indicator of at least one downlink (DL) reference signal (RS) resource, and a specific ID for the indicator of the at least one DL RS resource among the at least one ID, and wherein capability information corresponding to the specific ID includes information indicating that a maximum number of sounding reference signal (SRS) ports supported by the UE is 0 or information indicating that a maximum number of SRS ports is not applicable.

13. A base station performing uplink reception in a wireless communication system, the base station comprising:

at least one transceiver;

and at least one processor connected to the at least one transceiver, wherein the at least one processor is configured to:

receive, from a user equipment (UE) through the at least one transceiver, capability information related to at least one index (ID);

transmit, to the UE through the at least one transceiver, configuration information related to a beam report; and receive, from the UE through the at least one transceiver, report information based on the configuration information, wherein the report information includes an indicator of at least one downlink (DL) reference signal (RS) resource, and a specific ID for the indicator of the at least one DL RS resource among the at least one ID, and wherein capability information corresponding to the specific ID includes information indicating that a maximum number of sounding reference signal (SRS) ports supported by the UE is 0 or information indicating that a maximum number of SRS ports is not applicable.

* * * * *